United States Patent [19]
Boswell et al.

[11] 3,737,142
[45] June 5, 1973

[54] ROTARY VALVE OPERATOR

[76] Inventors: Howard G. Boswell, 2317 Persa, Houston, Tex. 77019; Charles C. Partridge, 7937 Turquoise, Houston, Tex. 77055

[22] Filed: July 8, 1971

[21] Appl. No.: 160,696

Related U.S. Application Data

[63] Continuation-in-part of Ser. No. 835,603, June 23, 1969, abandoned.

[52] U.S. Cl..................................251/58, 74/107
[51] Int. Cl..............................F16k 31/16
[58] Field of Search ................251/58; 74/107

[56] References Cited

UNITED STATES PATENTS

| | | | |
|---|---|---|---|
| 3,298,286 | 1/1967 | Tyler | 251/58 X |
| 3,385,120 | 5/1968 | Nott | 74/107 |
| 3,650,506 | 3/1972 | Bruton | 251/58 X |
| 3,261,266 | 7/1966 | Ledeen et al. | 251/58 |
| 3,460,799 | 8/1969 | Sanctuary | 251/58 X |

*Primary Examiner*—Arnold Rosenthal
*Attorney*—F. W. Anderson, C. E. Tripp, and W. W. Ritt, Jr.

[57] ABSTRACT

An operator for opening and closing a butterfly or other rotary valve. The operator is powered by a fluid cylinder with a reciprocating piston that is connected to a lever secured to the valve's stem, which lever converts the piston's rectilinear movement into rotary motion to rotate the valve's flow control element between its open and closed positions. The lever has an arcuate slot in the configuration of an involute curve in order that the piston's force always is applied at a right angle to the slot's surfaces, thereby precluding side loads and other undesired lateral forces on the piston, lever, and valve stem from arising. The operator includes a housing in which the remaining components are enclosed, and which serves as a means for mounting the operator on the body of a valve, a bearing for the lever's shaft, a guide for a pin and clevis interconnecting the piston and the lever, a mount for the power cylinder, and a pressure vessel forming one end of the cylinder. The operator is structured so that cylinders of various sizes can be quickly and interchangeably connected to it, thereby facilitating use of one size of operator with a wide range of line pressure and valve sizes.

13 Claims, 6 Drawing Figures

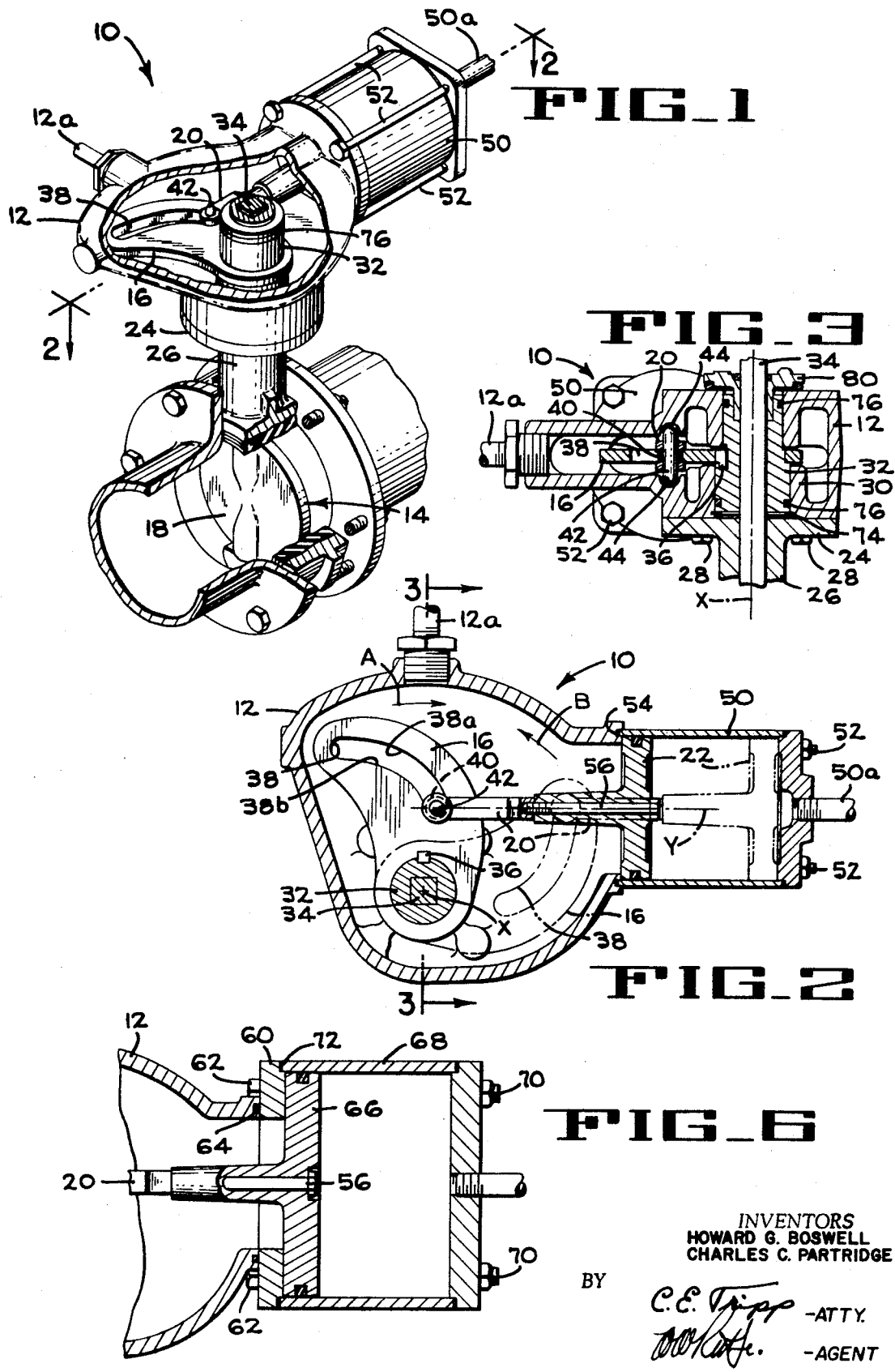

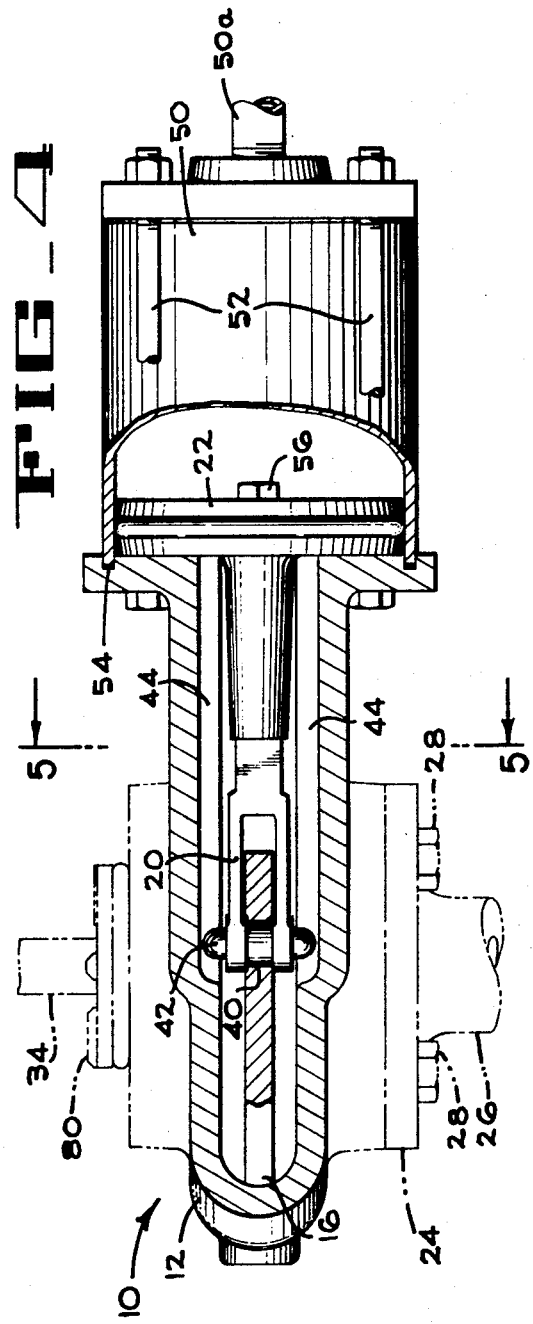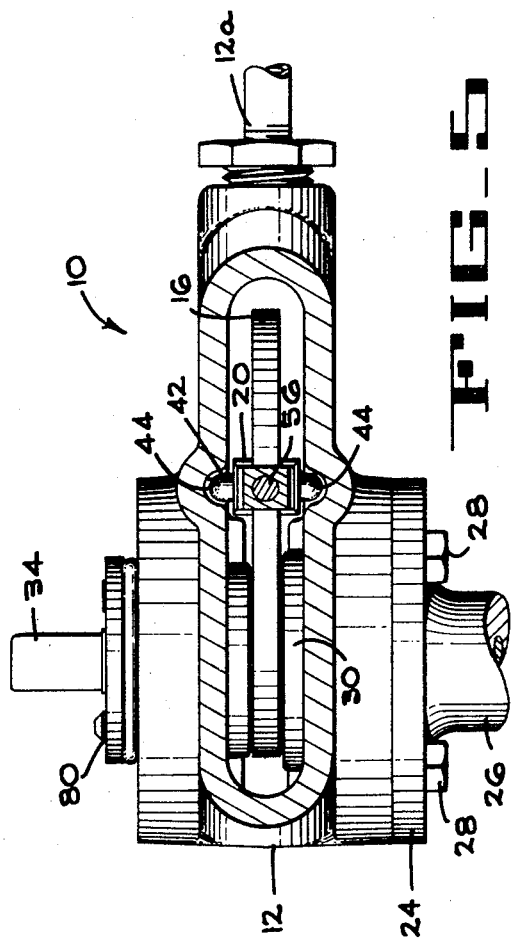

ROTARY VALVE OPERATOR

CROSS REFERENCE TO RELATED APPLICATION

This application is continuation-in-part of our copending C.G. Partridge et al. United States application Ser. No. 835,603, filed June 23, 1969, and entitled "Valve Actuating Mechanism", now abandoned.

BACKGROUND OF THE INVENTION

The field of art to which the present invention pertains involves apparatus for operating valves, and more particularly to pneumatic-powered operators for opening and closing butterfly and other valves having a rotatable flow control element. From the standpoint of the United States patent classification system, the art relevant to this invention is to be found in classes 92 and 251.

In order to effectively compete in today's market, valve manufacturers find it necessary to furnish power operators for their products, not only because valves of large size usually require something more than manual efforts to open and close them, but also because their operation from remote or central locations, or in many cases automatic operation, has come to be essential. While some valve operators are electrically powered, pneumatic power is more widely employed for butterfly and other valves with rotatable flow control elements since it provides better control at a lesser cost. Differing operating conditions, e.g. the environment in which the valve is used, the pneumatic line pressure available for powering the operator, the frequency of valve operation, and the type of service, i.e., on-off or throttling, to which the valve is subjected, require special attachments, such as positioners, position-indicating limit switches, fail-safe devices, etc., to be included with the operator. Meeting this requirement by adapting commercial components involves so many variations in design and size that the cost and difficulty of controlling the necessary inventory is entirely out of line with the sales volume involved, and the resultant low production quantities of individually manufactured items makes for very high costs, resulting in a product which is not attractive to the manufacturer or user.

For on-off operation with high pressure air, an elementary or first type of known valve operator comprises an air cylinder, usually double-acting, mounted on a bracket bolted to the valve's body, and with its piston connected at both ends by a clevis to a simple lever on the valve stem. A second type of operator comprises a cylinder with a flanged front mount and a link connecting it to a similar stem lever, and as a variation a trunnion front mount with a clevis connecting the rod to the lever. For frequent on-off or continually moving throttling service, operators of a third type for use with low line pressure are actuated by double-acting or spring return diaphragm air motors, and by special double-acting air cylinders, or single-acting air cylinders with air cushions or spring return, where higher air pressure is available or larger valves are involved. These are connected to the valve stems by fully enclosed oil bath rack and pinion mechanisms, or by adjustable levers and links, with or without bearings or lubricated bushings. A fourth general type of operator comprises a unitized cylinder or cylinders mounted on a housing enclosing a Scotch yoke, rack and pinion, or lever and link-type mechanism which converts the longitudinal motion of the cylinder's piston to ninety degree rotary motion. The housing may be pressurized to act as one end of the cylinder, or it may be separated from the cylinder and filled with oil. The complete assembly either fits directly on the valve stem and valve flange, or is connected to the stem and flange by open or enclosed adaptors.

The fourth type of operator, and the rack and pinion connecting mechanism sometimes used in it and the third type, are relatively very expensive, hence do not enjoy a ready market even though they are more durable and resistant to deterioration than the less costly devices. All of the remaining foregoing mechansims impart a heavy bending load on the valve stem and a high side load on the upper portion of the stem and its bearings. These loads are the occasion of accelerated wear resulting in clearance that, with respect to butterfly valves for example, facilitates flutter of the valve disc that, in turn, can cause fretting and early complete valve failure. Clearance also results in a lag in disc position, a reduction in control sensitivity, and even incomplete shutoff in severe situations. Furthermore, the characteristic quick initial movement of the piston in a pneumatic cylinder, due to the expansion of the air after sufficient pressure builds up to overcome static friction, causes impact where clearance is present, thus enhancing wear.

Another major problem with all operators employing a lever between the piston and the valve stem is the transverse force, resulting mainly from the resistance of the valve's flow control element to position change, exerted by the lever as a side load on the piston and its rod normal to their otherwise unrestricted linear path of travel. This force can be quite large, especially if the torque required to rotate the valve's flow control element is great, and must be overcome in order that the operator can function.

The proposed solutions to this transverse load problem all center around the use of rollers, rods, etc., for guiding the piston and its rod in a straight path. However, although some of these guide mechanisms may control the path of the piston, the transverse forces and their detrimental effects are still present. Furthermore, these guide elements constitute an added cost, increase the weight of the operator which in turn imposes an even greater load on the valve supporting it, and provide another potential site for operator breakdown.

Accordingly, one object of the present invention is to provide a new rotary valve operator that includes all of the advantages of the foregoing devices, yet is less complex in structure and more versatile in use.

Another object of the present invention is the provision of a new type of rotary valve operator lever for converting rectilinear movement of a power piston into a rotary force for opening and closing a valve's flow control element.

Yet another object of the present invention is the provision of a valve operator adapted to facilitate quick and easy interchange of the various sizes of pistons and cylinders used to provide it with power.

Still another object of the present invention is to provide a simplified pneumatic operator for rotary valves that has less moving parts, and a correspondingly greater freedom from malfunction, than other operators of similar type.

Another object of the present invention is the provision of an improved rotary valve operator that affords enhanced economics in manufacture and assembly without sacrifice of strength or power output characteristics.

SUMMARY OF THE INVENTION

The present invention comprises a fluid pressure powered operator for rotary type valves, with a lever that has a uniquely shaped slot for converting essentially the entire rectilinear force of a piston into torque that is transmitted undiminished to the flow control element of a valve on which the operator is mounted. The operator includes a housing that encloses the lever and the other elements, and the housing additionally functions as a means for mounting the operator on a valve, as a bearing for a lever shaft, as a guide for a pin and clevis that interconnect a piston and the lever, and as a mount for the piston's cylinder. The housing also forms one end of the cylinder and cooperates with it to provide a double-acting fluid pressure means for reciprocating the piston in a linear path.

The lever is non-rotatably mounted on the valve's stem, and it's shaped in the configuration of an involute curve whose circle of generation is concentric with the axis of the stem. A cylindrical roller is positioned in the slot, a cylindrical pin extends coaxially through the roller and the arms of a clevis which straddles the lever, and the interior walls of the housing are provided with a pair of opposed grooves that serve to retain the pin in place. The stem portion of the clevis is connected to the piston, so that rectilinear movement of the piston will effect rotation of the lever and the valve stem about the stem's axis. The centerline through the piston and clevis intersects the common axis through the roller and pin, and is tangent to the circle of generation of the involutely curved slot. Thus, as the piston is reciprocated in the cylinder the roller applies a force against the side of the slot in a direction that is always normal to it at the point of contact, so that the only lateral or side load that can occur on the clevis and piston is the result of friction, such as between the roller and the slot, and misalignment of the piston, lever, etc.

The cylinder is bolted to the housing, and the piston is similarly secured to the clevis by a bolt, to facilitate quick and easy interchange of cylinders for adapting the operator to different line pressures and valves with various operational torque requirements.

BRIEF DESCRIPTION OF THE DRAWINGS

FIG. 1 is an isometric view of a valve operator mounted on a butterfly valve according to this invention, with portions broken away to better illustrate the operator's interior components.

FIG. 2 is an enlarged horizontal section taken along line 2—2 of FIG. 1.

FIG. 3 is a transverse section taken along the line 3—3 of FIG. 2.

FIG. 4 is an enlarged side elevation of the valve operator of FIG. 1, with some portions being shown in phantom line and portions being broken away to show the internal construction.

FIG. 5 is a view taken along the line 5—5 of FIG. 4.

FIG. 6 is a fragmentary horizontal section showing how the valve operator of FIGS. 1—5 can be modified to accept a larger cylinder and piston.

DESCRIPTION OF THE PREFERRED EMBODIMENTS

Referring first to FIGS. 1-3 of the drawings, a valve operator 10 according to this invention comprises a housing 12 that serves, inter alia, as a means for mounting the operator on a butterfly or other rotary valve generally designated at 14, a lever 16 for converting linear force to torque for opening and closing the valve's disc 18, and a clevis 20 for transmitting the rectilinear movement of a piston 22 to the lever 16. The housing 12 is secured to the neck flange 24 of the valve's body 26 by cap screws 28, and forms a bearing at 30 for a lever shaft 32 that is non-rotatably coupled to the valve's stem 34, such as by a square or other angular shaped key or spline system (FIG. 2).

The lever 16 is mounted on its shaft 32, and secured non-rotatably thereto by a key 36 (FIG. 2). The lever has an arcuate slot 38 in the shape of an involute curve whose circle of generation is concentric with the common axis "X" of the valve stem 34 and the lever shaft 32. The clevis 20 is coupled to the lever 16 by a roller 40 that is received in the involute slot 38 and is rotatably mounted between the arms of the clevis by a pin 42. The interior of the housing 12 is structured to form a pair of opposed straight grooves 44 (FIGS. 3-5) in which the pin 42 travels as the operator is opening or closing the valve, the grooves 44 thus serving to retain the pin 42 in place.

The power for actuating the operator 10 is supplied by a pneumatic cylinder 50 that is releasably secured airtight to the housing 12 by bolts 52 and a gasket 54. The cylinder's piston 22 is similarly secured in a releasable manner to the neck of the clevis 20 by a bolt 56. Accordingly, when it is desired to employ a cylinder and piston of different size or capacity, removal of the bolts 52 and 56 will quickly and easily facilitate the interchange. If a piston and cylinder of larger diameter than that shown in FIGS. 1-5 is to be coupled to the operator, an adapter plate 60 (FIG. 6) is fastened air-tight to the housing 12 by cap screws 62 and a seal ring 64, the oversize piston 66 connected to the clevis 20 by the bolt 56, and the oversize cylinder 68 secured in an air-tight fashion to the adapter plate 60 by bolts 70 and gasket 72.

The lever shaft 32 is held in place in the housing 12 by a retainer ring 74 (FIG. 3), and is sealed air-tight to the housing's bearing portion 30 by a pair of seal rings 76. Thus, in the operator's fully assembled condition the housing 12 constitutes an air-tight vessel that functions as one end or "half" of a double-acting cylinder, the other half being, of course, the cylinder 50 (or 68). Accordingly, when air pressure is admitted into the housing 12 through port 12a, and simultaneously the port 50a of the cylinder 50 is vented, the piston 22 (FIG. 2) will be forced to the right into the position indicated in phantom lines, causing the lever 16 to rotate clockwise approximately 90° into its new position shown in phantom, and thus opening the valve disc 18. In a corresponding, but reverse manner, when air pressure is admitted through port 50a and vented through port 12a, the piston 22 and the lever 16 will return to their respective positions illustrated in full in FIG. 2, and the valve disc 18 will close. The same operation, of course, pertains to the modified form of operator shown in FIG. 6.

The position of the valve disc 18 at any time can be determined by means of an indicator ring 80 (FIG. 3) that is fitted to and rotates with the valve stem 34.

As stated above, the circle of generation of the lever's involute slot 38 is concentric with the axis "X"

about which the lever and the valve stem 34 rotate. By definition, an involute curve is normal to all lines tangent to its circle of generation at the points where the lines intersect the curve. As illustrated in FIG. 2, the roller 40, pin 42, and clevis 20 reciprocate with the piston 22 along the center line "Y," which center line is tangent to the involute slot's circle of generation and therefore normal to the slot at its intersection therewith. Accordingly, the linear force of the piston 22 is exerted against the lever 16 in a direction normal thereto, regardless of whether the lever is at either end of its rotational path or at some position in between. Thus, in reference to FIG. 2 as the piston 22 moves to the right the roller 40 will exert a "pulling" force against the slot's side 38a, causing the lever to rotate about the axis "X" in the direction of arrow A, and the direction of this pulling force remains normal to the side 38a as the roller 40 moves along it. In corresponding manner, as the piston 22 moves to the left the roller 40 exerts a "pushing" force against the slot's side 38b, causing the lever to rotate about axis "X" in the direction of arrow B, and this pushing force continues in a direction normal to the side 38b while the roller 40 traverses it.

The result is that when all the elements of this valve operator are properly aligned, no side component that would create an adverse lateral load on the piston, clevis, etc., such as occurs with the use of other types of valve operator levers, exists. Thus, the total force exerted by the piston is transmitted undiminished to the valve stem as torque, except for whatever minute amount is offset by friction between the roller, pin, clevis and slot.

The absence of a side component of the piston's force eliminates the necessity of a piston guide with a high load carrying capacity. If the components of the operator are not in precise alignment, as for example if there is excessive friction between the roller 40 and the slot 38 or if the center line "Y" is not exactly normal to the slot 38, the minor side components that are developed can be easily absorbed by the housing through the pin 42 and its retaining grooves 44. Although engineering evaluation led to the sound assumption that if a side component of the piston's linear force sufficient to cause the pin to contact the grooves were developed the pin would slide in the grooves, thereby causing wear of both the pin and the housing surfaces, the results of extensive testing prove that the pin instead rolls along the grooves, thus for practical purposes precluding all wear therebetween. In short, whenever a guide for the piston, etc., is needed, this operator automatically supplies one.

When the torques and forces that occur on the pin 42 as the piston 22 is moved, are compared to the torques and forces occurring on that pin when a conventional lever with a straight slot is substituted for the lever 16, it is clearly established that the pin will roll in the grooves 44 only when the lever 16 is employed. This means that with a conventional lever it would be necessary to provide a guide especially for the piston, thereby undesirably increasing the weight and manufacturing cost, and reducing the compactness, efficiency and service life of the operator.

Because the lever's involute slot 38 provides a constant mechanical advantage with the piston 22, the ratio of angular travel, i.e., rotation, of the valve stem 34 and disc 18 to the linear travel of the piston 22 will remain constant, and as a result the valve can be opened or closed to any desired position, i.e., "throttled," by admission of a measured amount of air pressure to the appropriate side of the piston. This is a highly beneficial feature that is not obtainable with the other types of valve operator levers, as they function only through mechanical advantage that varys with respect to the air pressure against the piston as the valve stem rotates.

Although a pin 42 with rounded or spherical ends is illustrated for purposes of providing a complete disclosure of one embodiment of the invention, it should be understood that the ends of the pin can be shaped in other configurations, such as cylindrical, conical and frusto-conical, with the grooves 44 shaped accordingly. Furthermore, although for purposes of reducing friction to a minimum the roller 40 is preferred, it is within the scope of this invention to eliminate the roller and enlarge the diameter of the pin 42 to also perform the roller's function.

With respect to the function of the lever 16, it is not necessary that the valve operator be powered by a pneumatic cylinder, as any means for imparting linear reciprocating motion to the lever, such as an hydraulic cylinder, a reversible electric motor, a single acting spring return cylinder, a diaphragm air motor, a double-acting air motor, or even manual means, would be acceptable.

When desired, a pneumatic positioner can be connected into the pressurized air lines leading to the ports 12a, 50a to position the disc of the butterfly valve at a certain angle between open and closed. As is well known, by the admission of certain air pressure to the positioner, it will admit sufficient air to the housing or cylinder to force the piston 22 forwardly or rearwardly and effect a consequent relative position of the butterfly valve disc.

In summary, the foregoing features make possible a valve operator having increased possibilities of more economical manufacture since much of the more complex and expensive machining necessary in manufacture of other operators can be eliminated without adding excessive additional cost or size. In addition, its flexibility for adaptation to cover a wide variety of conditions makes larger manufacturing volume, with attendant cost reduction, possible. Excellent durability is another virtue of this operator, even in spite of various severe environments in which it finds use, since it is fully enclosed. Reduction of friction and the constant mechanical advantage resulting from the unique involute configuration of the lever's slot facilitate the use of cylinders with minimum bores and strokes to produce a desired torque. Fail-safe operation of the operator of this invention also can be provided by any one of the various technics known in the industry, including spring return mechanisms, "air cushion" systems, and elastomer or impregnated fabric diaphragm actuators, and these all can be used with solenoid, manual, or other types of air valves for on-off service and positioners for throttling applications.

Although the best mode contemplated for carrying out the present invention has been herein shown and described, it will be apparent that modification and variation may be made without departing from what is regarded to be the subject matter of the invention.

What is claimed is:

1. A valve operator comprising:
    a housing, means forming with the housing a double-acting piston chamber, said means removably associated with the housing to facilitate interchanging said means with others of different size, a piston positioned for reciprocation in the chamber, a lever rotatably mounted in the housing for non-rotatable coupling to a rotary valve stem, said lever including an arcuate slot shaped in the configuration of an involute curve whose circle of generation is concentric with the lever's axis of rotation, and means for interconnecting the piston to the lever, said means including a bearing element for transmitting the piston's linear force against a side of the lever's slot in a direction that is normal to that side at every position of the bearing element relative thereto, said slot thereby providing a constant mechanical advantage with the piston while preventing the occurrence of a side force component on the interconnecting means, whereby when the piston is reciprocated in the chamber the linear force it exerts is converted substantially undiminished by the lever into torque about the lever's axis of rotation.

2. A valve operator according to claim 1 wherein the housing includes at least one longitudinal groove in which the bearing element rolls as the piston is reciprocated.

3. A valve operator according to claim 2 wherein the housing includes a pair of opposed parallel grooves disposed in the path of the bearing element to preclude longitudinal displacement of said bearing element from its functional position with the interconnecting means.

4. A valve operator according to claim 1 wherein the bearing element comprises a cylindrical pin adapted to roll along the sides of the lever's slot.

5. A valve operator according to claim 1 wherein the bearing element comprises a cylindrical roller, and wherein said roller is rotatably retained between the arms of a clevis by a cylindrical pin.

6. An operator for rotating the stem of a rotary valve, comprising:

a lever adapted for connection to the stem for unitary rotation therewith about a common axis, means associated with the lever comprising an involutely curved surface whose circle of generation is concentric with the axis of rotation of the stem, linear actuating means including a force transmitting element, means for reciprocating the force transmitting element in a direction tangential to the circle, and means interconnecting the force transmitting element to the lever, said interconnecting means associated with said lever such that operation of the linear actuating means causes the force transmitting element to pressure the interconnecting means against the involutely curved surface and rotate the lever, the line of force of the linear actuating means being at all times normal to the involutely curved surface so that virtually all of the force of the linear actuating means is converted into torque for imposition by the lever on the valve's stem and a constant mechanical advantage is maintained between the lever and the means for reciprocating the force transmitting element.

7. The valve operator of claim 6 wherein the linear actuating means comprises a double-acting pneumatic cylinder.

8. The valve operator of claim 6 wherein the linear actuating means comprises a double-acting hydraulic cylinder.

9. The valve operator of claim 6 wherein the rotatable valve is a butterfly valve.

10. The valve operator of claim 6 wherein the rotatable valve is a ball valve.

11. The valve operator of claim 6 wherein the rotatable valve is a plug valve.

12. The valve operator of claim 6 wherein the involutely curved surface forms part of a slot that passes completely through the lever, and the interconnecting means includes bearing means passing through the slot.

13. The valve operator of claim 12 wherein the bearing means includes a clevis having a roller rotatably mounted on its extending legs to pass through the slot.

* * * * *